US012561013B2

(12) United States Patent    (10) Patent No.:    US 12,561,013 B2

Lu et al.    (45) Date of Patent:    Feb. 24, 2026

(54) ACTIVE STYLUS HAVING DUAL OPERATION PROTOCOL SWITCHING AND METHOD THEREOF

(71) Applicants: DEXIN CORP., New Taipei (TW); Renaisser Technology Co., Ltd., Hsinchu County (TW)

(72) Inventors: Ho-Lung Lu, New Taipei (TW); Tzu-Yu Ting, Hsinchu County (TW)

(73) Assignees: DEXIN CORP., New Taipei (TW); Renaisser Technology Co., Ltd., Hsinchu County (TW)

( * ) Notice: Subject to any disclaimer, the term of this patent is extended or adjusted under 35 U.S.C. 154(b) by 0 days.

(21) Appl. No.: 18/748,015

(22) Filed: Jun. 19, 2024

(65) Prior Publication Data

US 2024/0427439 A1    Dec. 26, 2024

Related U.S. Application Data

(60) Provisional application No. 63/509,283, filed on Jun. 21, 2023.

(51) Int. Cl.
   *G06F 3/038*    (2013.01)
   *G06F 3/0354*    (2013.01)

(52) U.S. Cl.
   CPC ........ *G06F 3/0383* (2013.01); *G06F 3/03545* (2013.01)

(58) Field of Classification Search
   CPC .......................... G06F 3/03545; G06F 3/0383
   See application file for complete search history.

(56) References Cited

U.S. PATENT DOCUMENTS

| | | | |
|---|---|---|---|
| 2021/0026464 A1* | 1/2021 | Yamada | G06F 3/03545 |
| 2023/0409146 A1* | 12/2023 | Kim | G06F 3/04186 |
| 2024/0053881 A1* | 2/2024 | Lee | G06F 3/03545 |
| 2024/0143104 A1* | 5/2024 | So | G06F 1/1652 |

* cited by examiner

*Primary Examiner* — Chun-Nan Lin

(57) ABSTRACT

An active stylus having dual operation protocol switching includes a mode key configured to provide a logic level in response to a user's choice of operation protocols. A micro control unit is configured to generate a $V_{pp}$ (Voltage of point to point) control signal in response to the logic level. A signal power control module is configured to generate a $V_{pp}$ in response to the $V_{pp}$ control signal. A signal transmitting module is configured to generate and transmit a operation protocol in response to the $V_{pp}$.

12 Claims, 3 Drawing Sheets

100

100

ACTIVE STYLUS HAVING DUAL OPERATION PROTOCOL SWITCHING AND METHOD THEREOF

FIELD

The subject matter herein generally relates to an active stylus, especially an active stylus having dual operation protocol switching and method thereof.

BACKGROUND

The current active stylus worked under an operation mode of Microsoft Pen Protocol (MPP) and the current active stylus worked under an operation mode of Apple Pencil protocol do not have functions of cross-mode. If the user would like to switch between the two operation modes, the user must have two active styluses which respectively work under each of the two modes (MPP and Apple pencil protocol). Therefore, the users have demands for an active stylus having dual operation protocol switching.

SUMMARY

The purpose of the present disclosure is to provide an active stylus.

To achieve the above purpose, the current disclosure discloses an active stylus having dual operation protocol switching. The active stylus includes a mode key configured to generate a logic level in response to a user's choice of operation protocols. A micro control unit (MCU) is configured to generate a Voltage of point to point ($V_{pp}$) control signal in response to the logic level. A signal power control module is configured to generate a $V_{pp}$ and a signal transmitting module is configured to generate and transmit an operation protocol signal.

The current disclosure discloses a method of dual operation protocol switching of an active stylus. The steps comprise generating a logic level, by a mode key, in response to a user's choice of operation protocols; generating a Voltage of point to point ($V_{pp}$) control signal, by a micro control unit (MCU), in response to the logic level; generating a $V_{pp}$, by a signal power control module, in response to the $V_{pp}$ control signal; and generating and transmitting an operation protocol signal, by a signal transmitting module, in response to the $V_{pp}$.

It should be understood that the description in the section is not intended to identify key or important features of embodiments of the present disclosure, nor is it intended to limit the scope of the present disclosure. Other features of the present disclosure will be readily understood from the following specification.

BRIEF DESCRIPTION OF THE DRAWINGS

In the accompanying drawings, unless otherwise specified, the same reference numerals throughout multiple accompanying drawings indicate the same or similar parts or elements. These accompanying drawings are not necessarily drawn to scale. It should be understood that these accompanying drawings depict only some embodiments disclosed in accordance with the present disclosure and should not be considered as limiting the scope of the present disclosure.

DETAILED DESCRIPTION

Figure 1:
FIG. 1 is a schematic view of an active stylus having dual operation protocol switching of one embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasable connected.

Figure 2:
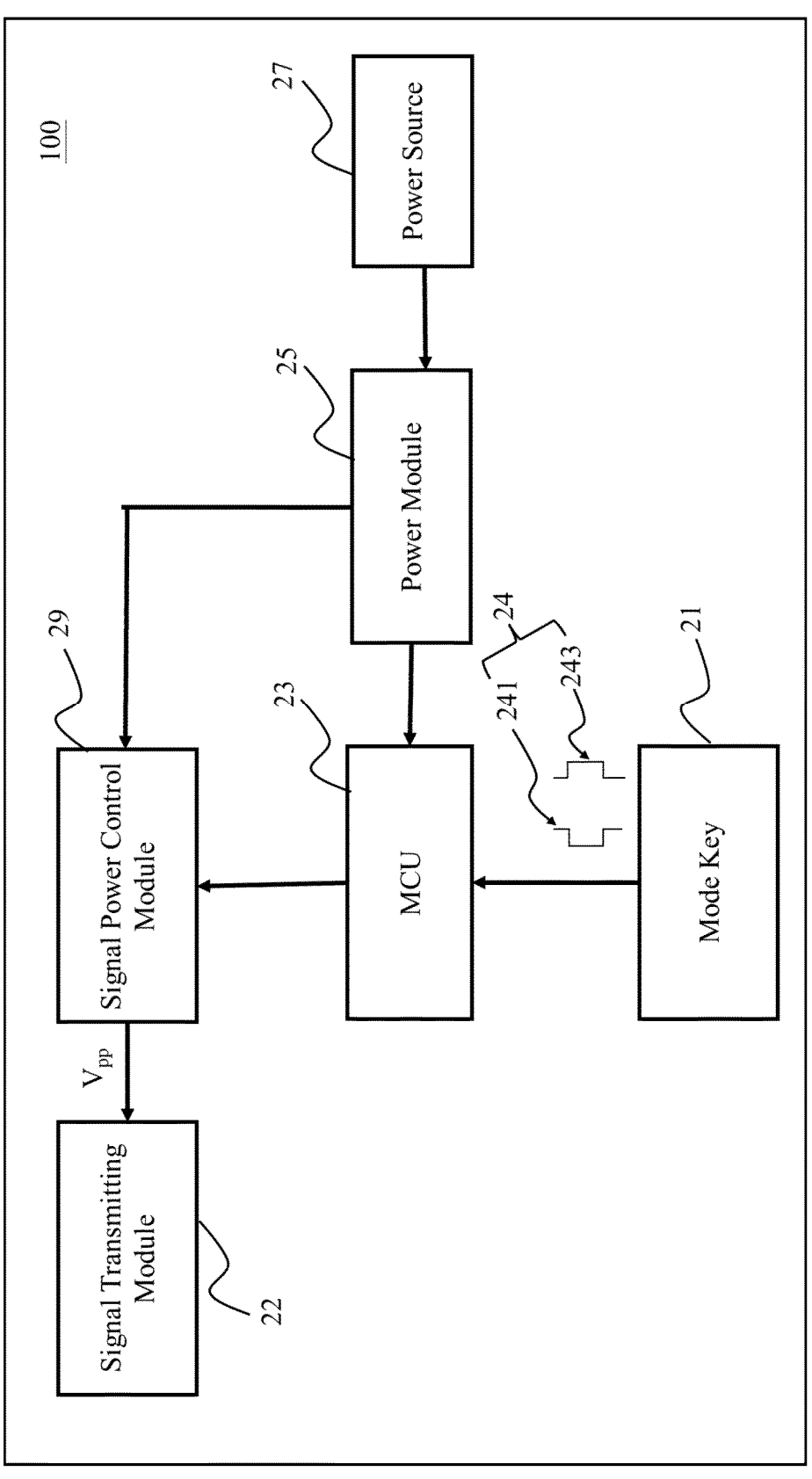
FIG. 2 is a block diagram of dual operation protocol switching of the active stylus of FIG. 1.

FIG. 1 is a schematic view of an active stylus 100 having dual operation protocol switching of one embodiment of the present disclosure. FIG. 2 is a block diagram of dual operation protocol switching of the active stylus 100 of FIG. 1. As shown in FIG. 1 and FIG. 2, the active stylus 100 includes a mode key 21. The mode key 21 is configured to generate a logic level 24. In this embodiment, the mode key 21 includes a touch switch. In some embodiments, the mode key 21 includes a Gravity Sensor (G-Sensor). In some embodiments, the mode key 21 includes a toggle switch.

In this embodiment, the logic level 24 includes a first logic level 241 and a second logic level 243. The first logic level 241 represents a first operation protocol. The second logic level 243 represents a second operation protocol. The phases of the first logic level 241 and the second logic level 243 are inverse to each other.

A power module 25 is coupled to a power source 27. The power module 25 is configured to convert power of power source 27 to provide voltage to a micro control unit (MCU) 23 and a signal power control module 29. In this embodiment, the power module 25 includes a power convertor. The power source 27 includes a battery. In some embodiments, the power source 27 includes an external power.

The MCU 23 is configured to generate a Voltage of point to point ($V_{pp}$) control signal in response to the logic level 24. The signal power control module 29 is configured to generate a $V_{pp}$ in response to the $V_{pp}$ control signal. In this embodiment, the signal power control module 29 further includes a voltage-regulating circuit. The voltage-regulating circuit is configured to generate the $V_{pp}$ in response to the $V_{pp}$ control signal. In this embodiment, the $V_{pp}$ includes a potential difference between a potential of a voltage output point of the voltage-regulating circuit and a reference potential.

In this embodiment, the $V_{pp}$ includes 22 Volt (V) and 42 Volt (V). The 22V is corresponding to Microsoft Pen Protocol (the first operation protocol). The 42V is corresponding to Apple Pencil protocol (the second operation protocol).

A signal transmitting module 22 is configured to generate and transmit an operation protocol signal in response to the $V_{pp}$. In this embodiment, the operation protocol signal is transmitted to a electronic device having a touch control screen. In this embodiment, the operation protocol signal includes an operation protocol signal of Microsoft Pen Protocol (MPP). In some embodiments, the operation protocol signal includes an operation protocol signal of Apple Pencil protocol.

In this embodiment, the signal transmitting module 22 includes a wireless signal transmitting module. The operation protocol signal is then broadcasted. In this embodiment, the wireless transmitting module includes a Bluetooth module.

Figure 3:
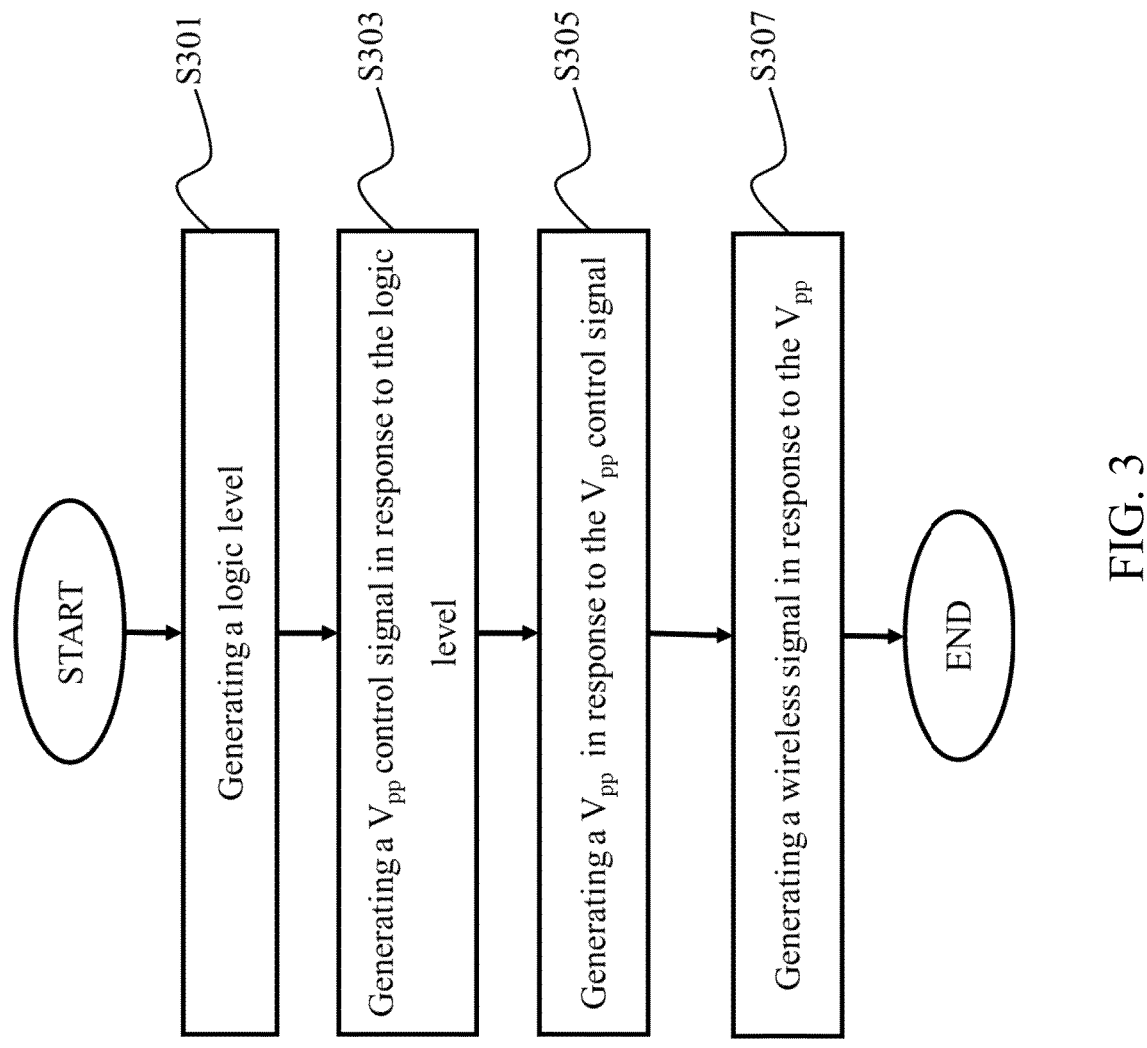
FIG. 3 is a flow chart of dual operation protocol switching of the active stylus of FIG. 1.

FIG. 3 is a flow chart of dual operation protocol switching of the active stylus 100 of FIG. 1. In this embodiment, as shown in FIG. 3, in step S301, a logic level is generated, by a mode key, in response to a user's choice of operation protocols and the logic level is then transmitted to a MCU. In this embodiment, the logic level includes a first logic level and a second logic level. The phases of the first logic level and the second logic level are inverse to each other.

In step S303, a Voltage of point to point (V pp) control signal is generated, by the MCU, in response to the logic level and transmitted to a signal power control module.

In step S305, a $V_{pp}$ corresponding to a operation protocol is generated, by the signal power control module, in response to the $V_{pp}$ control signal and transmitted to a signal transmitting module.

In this embodiment, the $V_{pp}$ includes 22 Volt (V) and 42 Volt (V). The 22V is corresponding to Microsoft Pen Protocol (the first operation protocol). The 42V is corresponding to Apple Pencil protocol (the second operation protocol). In this embodiment, the signal power control module 29 further includes a voltage-regulating circuit. The voltage-regulating circuit is configured to generate the $V_{pp}$ in response to the $V_{pp}$ control signal. In this embodiment, the $V_{pp}$ includes a potential difference between a potential of a voltage output point of the voltage-regulating circuit and a reference potential.

In step S307, an operation protocol signal is generated, by the signal transmitting module, in response to the Vpp and transmitted to an electronic device having a touch screen. In this embodiment, the operation protocol signal includes a MPP operation protocol signal. In some embodiments, the operation protocol signal includes Apple Pencil operation protocol signal. In this embodiment, the signal transmitting module includes a wireless signal transmitting module. In some embodiments, the wireless signal transmitting module includes a Bluetooth module.

The following is a switching example of the active stylus having dual operation protocol switching of the present disclosure. When the active stylus is working under MPP mode, a first logic level is executed and the $V_{pp}$ is 22V. In the meantime, the wireless signal of MPP is transmitting by the active stylus in the broadcasting way. Once the user would like to change the operation mode of the active stylus from MPP mode to Apple Pencil mode, a mode key of the active stylus is then triggered by the user and a second logic level is the generated. The phases of the first logic level and the second logic level are inverse to each other. The second logic level is then transmitted to a MCU.

A $V_{pp}$ control signal is generated, by the MCU, in response to the second logic level and transmitted to a signal power control module. The $V_{pp}$, 42V, corresponding to Apple Pencil protocol is then generated, by a voltage-regulating circuit of the signal power control module, in response to the $V_{pp}$ control signal. The $V_{pp}$, 42V, is then transmitted to the signal transmitting module. Since the signal transmitting module is a wireless signal transmitting module, the wireless signal of Apple pencil protocol is broadcasted and the operation protocol of the active stylus is changed from MPP to Apple pencil protocol.

The embodiments shown and described above are only examples and do not limit the patent scope of the disclosure. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. An active stylus having dual operation protocol switching, comprising:
   a mode key configured to generate a logic level in response to a user's choice of operation protocols;
   a micro controller configured to generate a Voltage of point to point ($V_{pp}$) control signal in response to the logic level;
   a voltage-regulating circuit configured to generate a $V_{pp}$ in response to the $V_{pp}$ control signal; and
   a wireless signal transmitting module configured to generate and transmit an operation protocol signal.

2. The active stylus of claim 1, wherein the mode key includes a touch switch.

3. The active stylus of claim 1, wherein the mode key includes a Gravity Sensor (G-Sensor).

4. The active stylus of claim 1, wherein the mode key includes a toggle switch.

5. The active stylus of claim 1, wherein the logic level includes a first logic level and a second logic level, wherein phases of the first logic level and the second logic level are inverse to each other.

6. The active stylus of claim 1, wherein the operation protocol includes a Microsoft Pen Protocol (MPP).

7. The active stylus of claim 1, wherein the operation protocol includes an Apple Pencil protocol.

8. A method of dual operation protocol switching of an active stylus, the steps comprising:
   generating a logic level, by a mode key, in response to a user's choice of operation protocols;
   generating a Voltage of point to point ($V_{pp}$) control signal, by a micro controller, in response to the logic level;
   generating a $V_{pp}$, by a signal power control module, in response to the $V_{pp}$ control signal, comprising:
   generating the $V_{pp}$, by a voltage-regulating circuit of the signal power control module, in response to the $V_{pp}$ control signal; and
   generating and transmitting an operation protocol signal, by a signal transmitting module, in response to the $V_{pp}$.

9. The method of claim 8, wherein the logic level includes a first logic level and a second logic level, wherein phases of the first logic level and the second logic level are inverse to each other.

10. The method of claim 8, wherein the operation protocol includes a Microsoft Pen Protocol (MPP).

11. The method of claim 8, wherein the operation protocol includes an Apple Pencil protocol.

12. The method of claim 8, wherein the step of generating and transmitting an operation protocol signal, by a signal transmitting module, in response to the $V_{pp}$ further includes transmitting the operation protocol signal.

\* \* \* \* \*